US007587354B2

(12) United States Patent
Parsons et al.

(10) Patent No.: US 7,587,354 B2
(45) Date of Patent: Sep. 8, 2009

(54) VERIFICATION OF NET ASSET VALUES

(75) Inventors: Robin L. Parsons, Taunton, MA (US); Thomas F. Ray, Weymouth, MA (US)

(73) Assignee: State Street Corporation, Boston, MA (US)

( * ) Notice: Subject to any disclaimer, the term of this patent is extended or adjusted under 35 U.S.C. 154(b) by 1629 days.

(21) Appl. No.: 09/994,975

(22) Filed: Nov. 27, 2001

(65) Prior Publication Data

US 2003/0101119 A1 May 29, 2003

(51) Int. Cl.
*G06Q 40/00* (2006.01)

(52) U.S. Cl. .............................. 705/37; 705/38; 705/36; 705/35

(58) Field of Classification Search ............. 705/35–38; 395/235
See application file for complete search history.

(56) References Cited

U.S. PATENT DOCUMENTS

| 5,712,987 | A |   | 1/1998  | Waits et al.        |        |
|-----------|---|---|---------|---------------------|--------|
| 5,717,923 | A |   | 2/1998  | Dedrick             |        |
| 5,812,988 | A | * | 9/1998  | Sandretto ......... | 705/36 R |
| 5,913,202 | A |   | 6/1999  | Motoyama            |        |
| 5,930,764 | A |   | 7/1999  | Melchione et al.    |        |
| 5,933,816 | A |   | 8/1999  | Zeanah et al.       |        |
| 5,940,843 | A |   | 8/1999  | Zucknovich et al.   |        |
| 6,128,602 | A |   | 10/2000 | Northington et al.  |        |
| 6,226,623 | B1 |   | 5/2001  | Schein et al.       |        |
| 6,236,991 | B1 |   | 5/2001  | Frauenhofer et al.  |        |
| 6,246,999 | B1 |   | 6/2001  | Riley et al.        |        |
| 2001/0034686 | A1 | * | 10/2001 | Eder ............... | 705/36 |
| 2003/0028459 | A1 | * | 2/2003  | Hillel .............. | 705/36 |
| 2003/0083973 | A1 | * | 5/2003  | Horsfall ........... | 705/37 |
| 2003/0101119 | A1 | * | 5/2003  | Parsons et al. ...... | 705/36 |

OTHER PUBLICATIONS

U.S. Cuts Deal on Pact To Ban Graft Globally; Multinational Negotiators Agree to Largely Exempt Business, Political Groups Bob Davis. Asian Wall Street Journal. Victoria, Hong Kong: Aug. 14, 2003. p. A.5.*

* cited by examiner

*Primary Examiner*—Frantzy Poinvil
*Assistant Examiner*—Clement B. Graham
(74) *Attorney, Agent, or Firm*—Ropes & Gray LLP

(57) ABSTRACT

Disclosed herein is a system for verifying financial data, such as a Net Asset Value ("NAV"), received from a third party. A new NAV for a fund may be supplied to the system, along with other data, for storage in a database of financial data. Upon receiving the new NAV, the system may analyze the NAV by comparing it to historical NAVs for that fund. If the NAV is within a certain variance, as compared to historical values, then the NAV may be stored as a current NAV for the fund. However, if the NAV differs from one or more historical values by more than a predetermined tolerance, the system may present to a provider of the NAV data one or more possible explanations for the variation, from among which the provider must select an explanation before the NAV is added to the database of financial data.

28 Claims, 5 Drawing Sheets

VERIFICATION OF NET ASSET VALUES

FIELD OF THE INVENTION

The present invention relates generally to a financial accounting system for maintaining data of a financial database, and more particularly to a method of verifying accuracy of new data received for addition to the database.

BACKGROUND OF THE INVENTION

Verification of financial data is an integral operational task executed by financial institutions that offer a broad range of investment and financial service. Financial institutions have an interest in mitigating risks which might arise if key operational tasks are executed without verification systems. One such operational task involves maintaining and updating net asset database for funds. The reliability such a database depends upon the robustness of the system administering the database in verifying the accuracy of the information entering and residing in the database.

The present invention addresses the need for robustness by disclosure of a system configured to verify the accuracy of financial data such as net asset data.

SUMMARY OF THE INVENTION

Disclosed herein is a system for verifying financial data, such as a Net Asset Value ("NAV"), received from a third party. A new NAV for a fund may be supplied to the system, along with other data, for storage in a database of financial data. Upon receiving the new NAV, the system may analyze the NAV by comparing it to historical NAVs for that fund. If the NAV is within a certain variance, as compared to historical values, then the NAV may be stored as a current NAV for the fund. However, if the NAV differs from one or more historical values by more than a predetermined tolerance, the system may present to a provider of the NAV data one or more possible explanations for the variation, from among which the provider must select an explanation before the NAV is added to the database of financial data.

The system may be realized, for example, in an n-tier Web server or other platform for deployment and use over a network, and may be configured to receive financial data and provide reports throughout the network. The system may also, or instead, be deployed within a local area network, corporate area network, or wide area network. The variance that is used as a threshold for requiring a user-provided explanation may be relative (e.g., a percentage change) or absolute (e.g., plus or minus a certain dollar value), and may vary from period to period according to broader market trends such as the Dow Jones Industrial Average or the Standard & Poors 500 composite index. Management tools may be provided for adding, deleting, or modifying the variance, as well as the possible explanations for exceeding the variance.

BRIEF DESCRIPTION OF THE DRAWINGS

The foregoing and other objects and advantages of the invention will be appreciated more fully from the following further description thereof, with reference to the accompanying drawings, wherein.

DETAILED DESCRIPTION OF CERTAIN EMBODIMENTS

To provide an overall understanding of the invention, certain illustrative embodiments will now be described, including a Web-deployed, client/server architecture for verifying externally provided net asset values for funds. The systems described herein may have particular applicability in a financial context, such as where a fund manager at a custodial bank manages a number of substantial holdings in various investment vehicles for an institution or high net worth individual, where the system provides for timely reporting of changes in asset values and review of the changes by a supervisor of the fund manager or the customer whose money is under management. However, it will be understood that the methods and systems described herein can be suitably adapted to any environment where data from an external source is provided for inclusion in a database that contains historical values for the same measurement. This may include, for example, physical measurements (e.g., height, weight, speed, force, energy, and so forth), meteorological measurements (e.g., rainfall, barometric pressure, temperature), physiological measurements (e.g., heart rate, blood pressure, body temperature), financial data (interest rates, stock prices, earnings, dividends), or any other measurement or quantity that may be sampled at fixed or varying periods. These and other applications of the systems described herein are intended to fall within the scope of the invention. More generally, the principles of the invention may be applicable to any environment where ongoing measurements of a quantity are received and stored.

Figure 1:
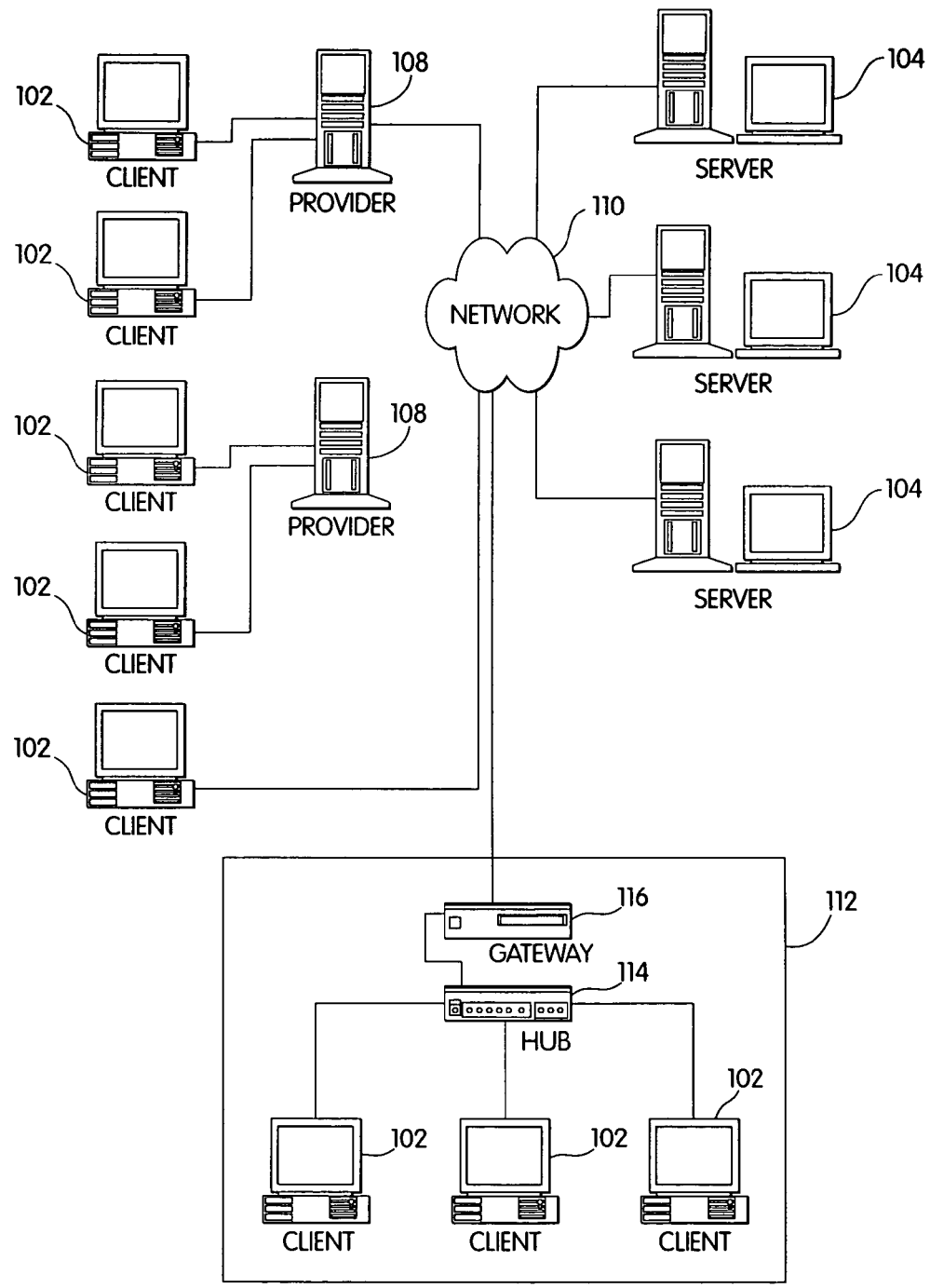
FIG. 1 shows a schematic diagram of the entities involved in an embodiment of a method and system disclosed herein.

FIG. 1 shows a schematic diagram of the entities involved in an embodiment of a method and system disclosed herein. In a system 100, a plurality of clients 102, servers 104, and providers 108 are connected via an internetwork 110. It should be understood that any number of clients 102, servers 104, and providers 108 could participate in such a system 100. The system may further include one or more local area networks ("LAN") 112 interconnecting clients 102 through a hub 114 (in, for example, a peer network) or a local area network server 114 (in, for example, a client-server network). The LAN 112 may be connected to the internetwork 110 through a gateway 116, which provides security to the LAN 112 and ensures operating compatibility between the LAN 112 and the internetwork 110. Any data network may be used as the internetwork 110 and the LAN 112.

In one embodiment, the internetwork 110 is the Internet, and the World Wide Web provides a system for interconnecting clients 102 and servers 104 through the Internet 110. The internetwork 110 may include a cable network, a wireless network, and any other networks for interconnecting clients, servers and other devices.

An exemplary client 102 includes the conventional components of a client system, such as a processor, a memory (e.g. RAM), a bus which couples the processor and the memory, a mass storage device (e.g. a magnetic hard disk or an optical storage disk) coupled to the processor and the memory through an I/O controller, and a network interface coupled to the processor and the memory, such as modem, digital subscriber line ("DSL") card, cable modem, network interface card, wireless network card, or other interface device capable of wired, fiber optic, or wireless data communications. One example of such a client 102 is a personal computer equipped with an operating system such as Microsoft Windows 95, Microsoft Windows NT, Unix, Linux, and Linux variants, along with software support for Internet communication protocols. The personal computer may also include a browser program, such as Microsoft Internet Explorer or Netscape Navigator, to provide a user interface for access to the Internet 110. Although the personal computer is a typical client 102, the client 102 may also be a workstation, mobile computer, Web phone, television set-top box, interactive kiosk, personal digital assistant, or other device capable of communicating over the Internet 110. As used herein, the term "client" is intended to refer to any of the above-described clients 102, as well as proprietary network clients designed specifically for the financial systems described herein, and the term "browser" is intended to refer to any of the above browser programs or other software or firmware providing a user interface for navigating the Internet 110 and/or communicating with the financial systems.

An exemplary server 104 includes a processor, a memory (e.g. RAM), a bus which couples the processor and the memory, a mass storage device (e.g. a magnetic or optical disk) coupled to the processor and the memory through an I/O controller, and a network interface coupled to the processor and the memory. Servers may be clustered together to handle more client traffic, and may include separate servers for different functions such as a database server, a file server, an application server, and a Web presentation server. Such servers may further include one or more mass storage devices such as a disk farm or a redundant array of independent disk ("RAID") system for additional storage and data integrity. Read-only devices, such as compact disk drives and digital versatile disk drives, may also be connected to the servers. Suitable servers and mass storage devices are manufactured by, for example, Compaq, IBM, and Sun Microsystems. As used herein, the term "server" is intended to refer to any of the above-described servers 104.

Focusing now on the internetwork 110, one embodiment is the Internet. The structure of the Internet 110 is well known to those of ordinary skill in the art and includes a network backbone with networks branching from the backbone. These branches, in turn, have networks branching from them, and so on. The backbone and branches are connected by routers, bridges, switches, and other switching elements that operate to direct data through the internetwork 110. However, one may practice the present invention on a wide variety of communication networks. For example, the internetwork 110 can include interactive television networks, telephone networks, wireless data transmission systems, two-way cable systems, customized computer networks, interactive kiosk networks and automatic teller machine networks. Further, various data resources may be available through the internetwork 110, including text, images, multi-media, and databases that are provided through command line or graphical front-ends over the internetwork 110, and databases available through local networks connected to the internetwork 110.

In the Internet, Internet service providers 108 such as Microsoft Network, America OnLine, Prodigy and CompuServe may offer dial-in service. The Internet service providers 108 may also include any computer system which can provide Internet access to a client 102. Of course, the Internet service providers 108 are optional, and in some cases, the clients 102 may have direct access to the Internet 110 through a dedicated DSL service, ISDN leased lines, T1 lines, digital satellite service, cable modem service, or any other high-speed connection. Any of these high-speed services may also be offered through one of the Internet service providers 108.

In its embodiment as the Internet, the internetwork 110 consists of a worldwide computer network that communicates using the well-defined Transmission Control Protocol ("TCP") and Internet Protocol ("IP") to provide transport and network services. Computer systems that are directly connected to the Internet 110 each have a unique IP address. The IP address consists of four one-byte numbers (although a planned expansion to sixteen bytes is underway with IPv6). The four bytes of the IP address are commonly written out separated by periods such as "194.152.65.222". To simplify Internet addressing, the Domain Name System ("DNS") was created. The DNS allows users to access Internet resources with a simpler alphanumeric naming system. A DNS name consists of a series of alphanumeric names separated by periods. For example, the name "www.lga-inc.com" corresponds to a particular IP address. When a domain name is used, the computer accesses a DNS server to obtain the explicit four-byte IP address.

It will be appreciated that other internetworks 110 may be used with the invention. For example, the internetwork 110 may be a wide-area network, a local area network, or corporate area network. The internetwork 110 may be any other network used to communicate data, such as a cable broadcast network. All of the network components described above may, either alone or in combination, form the internetwork 110 described herein. It will be understood that the terms "internetwork" and "network" are intended to refer to any such network, unless specifically noted otherwise.

To further define the resources on the Internet, the Uniform Resource Locator system was created. A Uniform Resource Locator ("URL") is a descriptor that specifically defines a type of Internet resource along with its location. URLs have the following format:

resource-type://domain.address/path-name where resource-type defines the type of Internet resource. Web documents are identified by the resource type "http" which indicates that the hypertext transfer protocol should be used to access the document. Other common resource types include "ftp" (file transmission protocol), "mailto" (send electronic mail), "file" (local file), and "telnet." The domain.address defines the domain name address of the computer that the resource is located on. Finally, the path-name defines a directory path within the file system of the server that identifies the resource. As used herein, the term "IP address" is intended to refer to the four-byte Internet Protocol address, and the term "Web address" is intended to refer to a domain name address, along with any resource identifier and path name appropriate to identify a particular Web resource. The term "address," when used alone, is intended to refer to either a Web address or an IP address.

In an exemplary embodiment, a browser, executing on one of the clients 102, retrieves a Web document at an address from one of the servers 104 via the internetwork 110, and displays the Web document on a viewing device, e.g., a screen. A user can retrieve and view the Web document by entering, or selecting a link to, a URL in the browser. The browser then sends an http request to the server 104 that has the Web document associated with the URL. The server 104 responds to the http request by sending the requested Web document to the client 102. The Web document is an HTTP object that includes plain text (ASCII) conforming to the HyperText Markup Language ("HTML"). Other markup languages are known and may be used on appropriately enabled browsers and servers, including the Dynamic HyperText Markup Language ("DHTML"), the Extensible Markup Language ("XML"), the Extensible Hypertext Markup Language ("XHTML"), and the Standard Generalized Markup Language ("SGML").

Each Web document usually contains hyperlinks to other Web documents. The browser displays the Web document on the screen for the user and the hyperlinks to other Web documents are emphasized in some fashion such that the user can identify and select each hyperlink. To enhance functionality, a server 104 may execute programs associated with Web documents using programming or scripting languages, such as Perl, C, C++, or Java. A server 104 may also use server-side scripting technologies such as ColdFusion from Allaire, Inc., or PHP. These programs and languages perform "back-end" functions such as order processing, database management, and content searching. A Web document may also include references to small client-side applications, or applets, that are transferred from the server 104 to the client 102 along with a Web document and executed locally by the client 102. Java is one popular example of a programming language used for applets. The text within a Web document may further include (non-displayed) scripts that are executable by an appropriately enabled browser, using a scripting language such as JavaScript or Visual Basic Script. Browsers may further be enhanced with a variety of helper applications to interpret various media including still image formats such as JPEG and GIF, document formats such as PS and PDF, motion picture formats such as AVI and MPEG, and sound formats such as MP3 and MIDI. These media formats, along with a growing variety of proprietary media formats, may be used to enrich a user's interactive and audio-visual experience as each Web document is presented through the browser. The term "page" as used herein is intended to refer to the Web document described above, as well as any of the above-described functional or multimedia content associated with the Web document.

Figure 2:
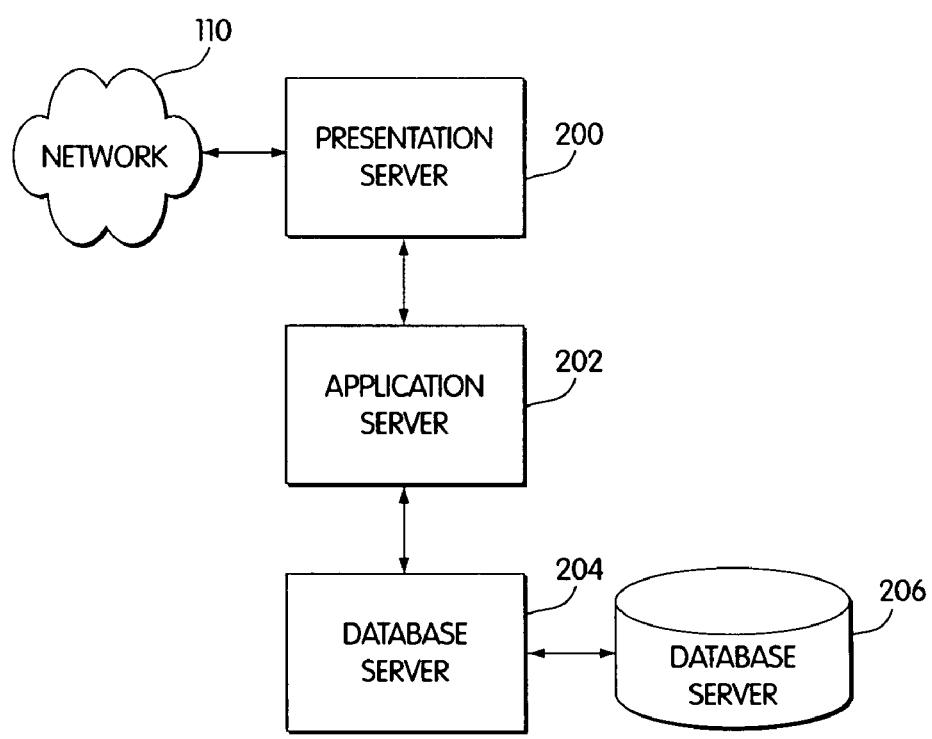
FIG. 2 shows a block diagram of a server that may be used with the systems described herein.

FIG. 2 shows a block diagram of a server that may be used with the systems described herein. In this embodiment, the server 104 includes a presentation server 200, an application server 202, and a database server 204. The application server 202 is connected to the presentation server 200. The database server 204 is also connected to the presentation server 200 and the application server 202, and is further connected to a database 206 embodied on a mass storage device. The presentation server 200 includes a connection to the internetwork 110. It will be appreciated that each of the servers may comprise more than one physical server, as required for capacity and redundancy, and it will be further appreciated that in some embodiments more than one of the above servers may be logical servers residing on the same physical device. It will further be appreciated that one or more of the servers may be at a remote location, and may communicate with the presentation server 200 through a local area or wide area network. The term "host," as used herein, is intended to refer to any combination of servers described above that include a presentation server 200 for providing access to pages by the clients 102. The term "site," as used herein, is intended to refer to a collection of pages sharing a common domain name address, or dynamically generated by a common host, or accessible through a common host (i.e., a particular page may be maintained on or generated by a remote server, but nonetheless be within a site).

The presentation server 200 provides an interface for one or more connections to the internetwork 110, thus permitting more than one of the clients 102 (FIG. 1) to access the site at the same time. In one embodiment, the presentation server 200 comprises a plurality of enterprise servers, such as the ProLiant Cluster available from Compaq Computer Corp., or a cluster of E250's from Sun MicroSystems running Solaris 2.7. Other suitable servers are known in the art and may be used with the systems described herein. The server maintains one or more connections to the internetwork 110, such as through a tier one provider—one of the dozen or so national/international Internet backbones with cross-national links of T3 speeds or higher, such as MCI, UUNet, BBN Planet, and Digex. Each server may be, for example, an iPlanet Enterprise Server 4.0 from the Sun/Netscape Alliance. The presentation server 200 may also, for example, use the Microsoft Windows NT operating system, with a "front end" written in Microsoft Active Server Page ("ASP"), or some other programming language or server software capable of integrating ActiveX controls, forms, Visual Basic Scripts, JavaScript, Macromedia Flash Technology multimedia, e-mail, and other functional and multimedia aspects of a page. Typically, the front end includes all text, graphics, and interactive objects within a page, along with templates used for dynamic page creation.

A client 102 (FIG. 1) accessing an address hosted by the presentation server 200 will receive a page from the presentation server 200 containing text, forms, scripts, active objects, hyperlinks, etc., which may be collectively viewed using a browser. Each page may consist of static content, i.e., an HTML text file and associated objects (*.avi, *.jpg, *.gif, etc.) stored on the presentation server, and may include active content including applets, scripts, and objects such as check boxes, drop-down lists, and the like. A page may be dynamically created in response to a particular client 102 request, including appropriate queries to the database server 204 for particular types of data to be included in a responsive page. It will be appreciated that accessing a page is more complex in practice, and includes, for example, a DNS request from the client 102 to a DNS server, receipt of an IP address by the client 102, formation of a TCP connection with a port at the indicated IP address, transmission of a GET command to the presentation server 200, dynamic page generation (if required), transmission of an HTML object, fetching additional objects referenced by the HTML object, and so forth.

The application server 202 provides the "back-end" functionality of the Web site, and includes connections to the presentation server 200 and the database server 204. In one embodiment, the presentation server 200 comprises an enterprise server, such as one available from Compaq Computer Corp., running the Microsoft Windows NT operating system, or a cluster of E250's from Sun MicroSystems running Solaris 2.7. The back-end software may be implemented using pre-configured e-commerce software, such as that available from Pandesic, to provide some of the back-end functionality, including realization of application logic associated with the systems described herein. The software running on the application server 202 may include a software interface to the database server 204, as well as a software interface to the front end provided by the presentation server 200.

The database server 204 may be an enterprise server, such as one available from Compaq Computer Corp., running the Microsoft Windows NT operating system or a cluster of E250's from Sun MicroSystems running Solaris 2.7, along with software components for database management. Suitable databases are provided by, for example, Oracle, Sybase, and Informix. The database server 204 may also include one or more databases 206, typically embodied in a mass-storage device. The databases 206 may include, for example, user interfaces, search results, search query structures, user information, and the templates used by the presentation server to dynamically generate pages. In operation, the database management software running on the database server 204 receives properly formatted requests from the presentation server 200, or the application server 202. In response, the database management software reads data from, or writes data to, the databases 206, and generates responsive messages to the requesting server. The database server 204 may also include a File Transfer Protocol ("FTP") server for providing downloadable files.

Figure 3:
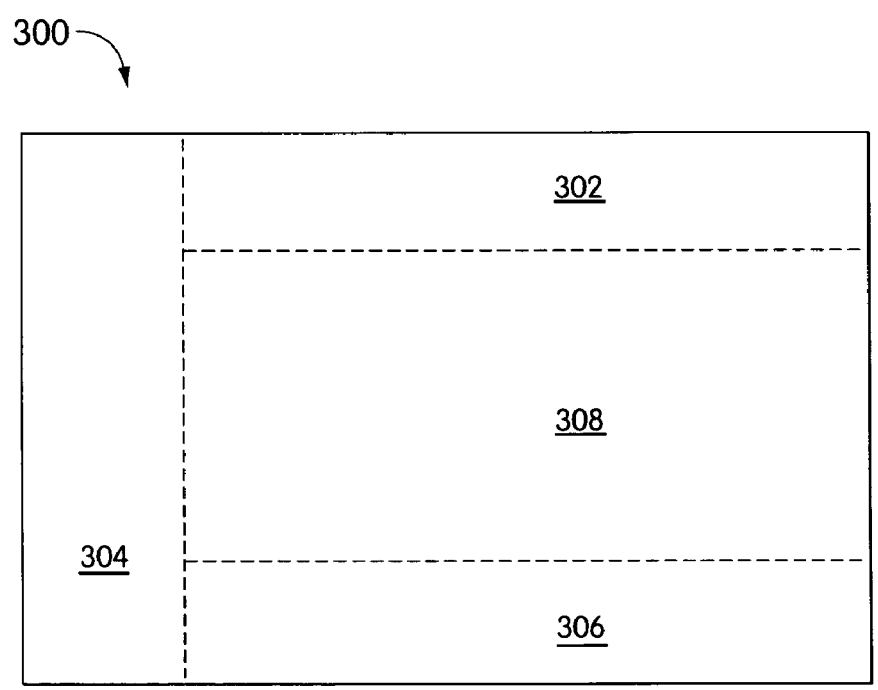
FIG. 3 shows a page that may be used as a user interface.

FIG. 3 shows a page that may be used as a user interface. The page 300 may include a header 302, a sidebar 304, a footer 306 and a main section 308, all of which may be displayed at a client 102 using a browser. The header 302 may include, for example, a title of the page, and one or more links to other pages displayed as hyperlinks, labeled tabs, or the like. The sidebar 304 may include a menu of choices for a user at the client 102. The footer 306 may include information concerning the page such as a "help" or "webmaster" contact, copyright information, disclaimers, a privacy statement, etc. The main section 308 may include content for viewing by the user. The main section 308 may also include, for example, tools for adding, deleting, or modifying account information, managing and displaying accounts, and so forth. It will be appreciated that the description above is generic, and may be varied according to where a client 102 is within a Web site related to the page, as well as according to any available information about the client 102 (such as display size, media capabilities, etc.), available information about the user at the client (such as profile information), or authorization to view or edit certain information.

A Web site including the page 300 may use cookies to track users and user information. In particular, a client 102 accessing the site may be accessed to detect whether the client 102 has previously accessed the page or the site. If the client 102 has accessed the site, then some predetermined content may be presented to the client 102. If the client 102 does not include a cookie indicating that the client 102 has visited the site, then the client 102 may be directed to a registration page where information may be gathered to create a user profile. The client 102 may also be presented with a login page, so that a pre-existing user on a new client 102 may nonetheless bypass the registration page.

The site may provide options to the client 102. For example, the site may provide a search tool by which the client 102 may search for content within the site, or content within financial databases associated with the site. Views of data provided by the site may be filtered according to account information stored in the database, such as fund names, fund managers, customer names, user names, and so forth. The site may include news items topical to the site. The site may provide a user profile update tool by which the client 102 may make alterations to a user profile. The site may include a help feature for providing assistance to users.

Different pages may be provided for different users of the system. For example, a database administrator may access underlying financial databases through a database administration page, which may allow a user to alter existing records, create new data structures (such as tables, fields, attributes, and so forth), modify relationships between data structures, backup data, and perform other functions. An application administrator may view an administration page through which a user may create new accounts, new users, new customers, and so forth, as well as control access privileges for other users and perform other administrative tasks. Institutional users such as managers may view a funds page which provides read-only access to all or some of the fund data stored in the databases, and which permits printouts of fund data. A fund manager may view a fund manager page which provides write access to some or all of the fund data, in addition to read access, so that fund data, customer data, and so forth may be created, updated, or viewed. Third parties, such as customers, may view pages that display their own financial data, and data providers may be permitted to add current data to the database. Each of the above functions may be realized through a different page, coupled with different underlying access privileges to data and code within the system described herein.

Certain users, such as fund managers or other institutional users, may be provided with tools within the page to assist with reviewing and using data maintained by the system. Filters may be provided for restricting data viewed by, for example, the fund manager according to user controlled criteria, such as by customer, by fund manager, by value, or by any other field within the database. Printing tools, along with various print layouts, may be provided. Data may be exported, such as to a tab delimited file, a comma delimited file, a spreadsheet file, or any other file suitable for use by the user. Certain users, such as the fund managers who update financial data, may import data to the system. The imported data may be, for example, in a tab-delimited file, a comma delimited file, a spreadsheet file, or the like.

Thus it will be appreciated that a networked financial management system may be realized in which current financial data may be obtained from a client device anywhere within the internetwork. New data may be provided to the system, and more particularly, the financial database within the system, from time to time by a user at a client device. The new data may be compared to historical data, and analyzed for possible errors, as will now be described in more detail.

Figure 4:
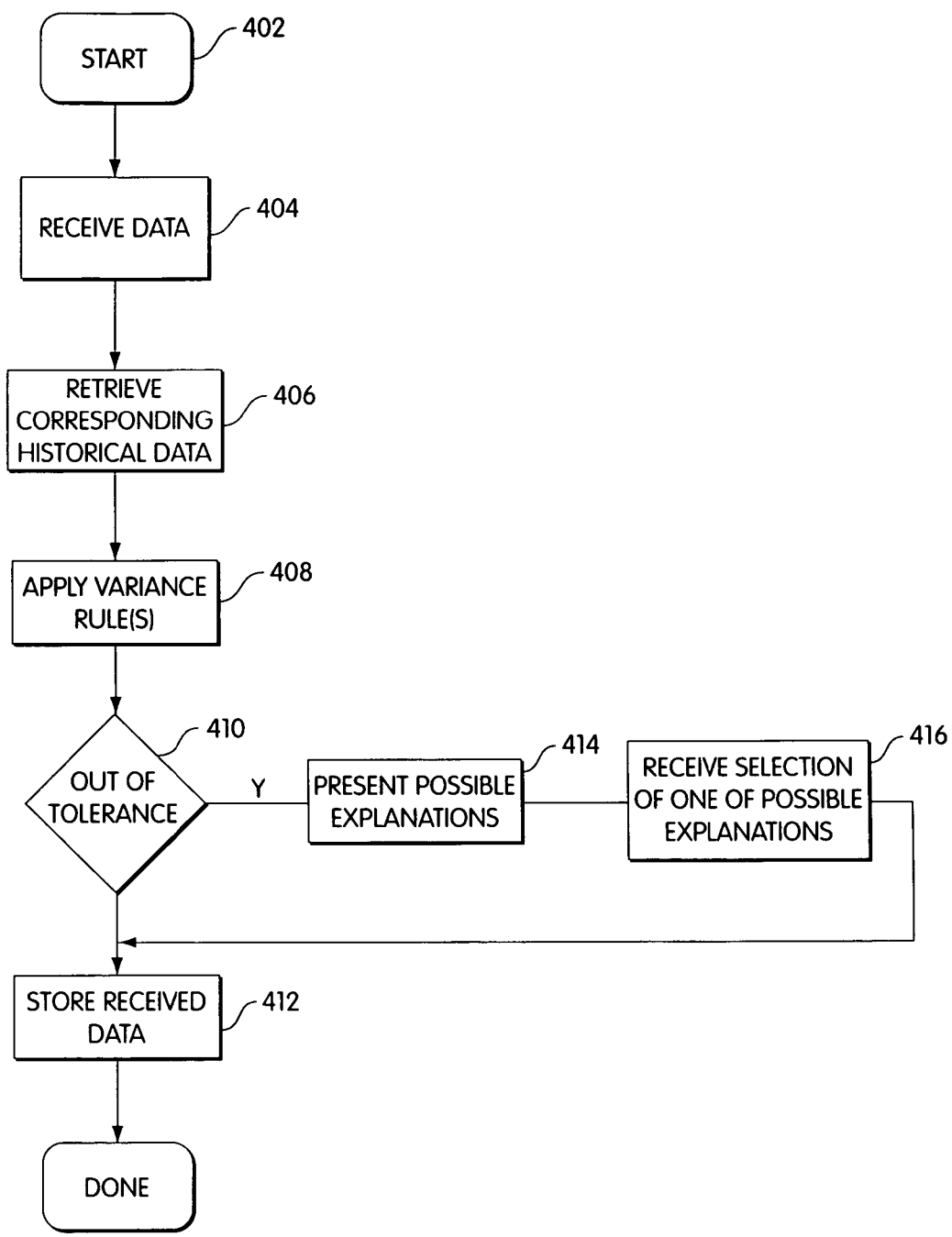
FIG. 4 is a flow chart of a verification process using the systems described herein.

FIG. 4 is a flow chart of a verification process using the systems described herein. The process 400 may start 402 when data is received, as shown in step 404. The data may be received, for example, from a client within the internetwork 110 of FIG. 1. The data may include any financial data that might be provided on a periodic or other basis. For a fund management system as described herein, the data may include, for example, a fund identifier (such as a fund name, fund code, or other identifier) that identifies a specific fund, a net asset value for the fund, and a liquid asset value for the fund. The data may be received as an upload to the system of a spreadsheet (such as an Excel spreadsheet that includes data for one or more funds), or may be manually provided through a user interface. The data may be provided by a fund manager who monitors and manages funds for the institution that provides the financial management system, or the data may be provided by a third party with specific information concerning the fund, and with access and uploading privileges for the system. As used in the following description, the term "user" is intended to refer to either of these parties, or any other party that might provide data to the system. In one embodiment of the system described herein, financial data is provided from a fund manager once each month.

As shown in step 406, corresponding historical data may be retrieved. For the financial data described above, this may include one or more previous values for the net asset value and the liquid asset value for a fund identified by the fund identifier. Where appropriate, as described below, application logic that applies variance rules to new data may be examined to determine what historical values to retrieve, such as the last instance of the value, the last five instances of the value, an average of the last n instances, or an average of all instances over a predetermined period of time, e.g., one week or one month. In this manner, only data that will be required to apply one or more variance rules needs to be retrieved from a location, such as a database, where the data is stored.

As shown in step 408, one or more variance rules may be applied. A threshold for the variance may be established to determine whether the variance is within a tolerance or not. The threshold may be relative, e.g., based upon current or historical values for data, or the threshold may be absolute, i.e., based upon a magnitude of change, regardless of current and/or historical values. The threshold may instead be based upon some external data. Also, a number of different variance rules may be applied, all of which is described in further detail below.

One type of variance rule may be based upon relative changes in the data. For example, where the rule is to be applied to a net asset value for a fund, as mentioned above, a tolerance may be established that is a fixed percentage of the received net asset value, or of one or more historical net asset values. The tolerance may be, for example, a percentage range such as +/−5%, +/−10%, +/−15%, +/−20%, +/−25%, or +/−30% of a recent historical net asset values for the fund. The tolerance may be an asymmetrical percentage range, e.g., from −5% to +17%. The tolerance may instead be established as a symmetric or asymmetric percentage of more than one historical value for the NAV. Where more than one historical value is used, an average of the multiple values may be taken, or a weighted average favoring more current values may be used, or a linear extrapolation of historical values or some other value may be calculated that is indicative of the different values, and used as a bases for determining a tolerance.

Another type of variance rule may be based upon absolute changes in the data. For example, where the rule is to be applied to the net asset value for a fund, as mentioned above, a tolerance may be established that is a number of dollars. The tolerance may be, for example, a range of +/−$50 million, +/−$100 million, +/−$500 million, +/−$1 billion, +/−$1.5 billion, or +/−$2 billion. As with relative tolerances described above, the absolute measures of tolerance may be asymmetric ranges such as −$50 million to +200 million.

Another type of variance rule may be based upon changes in the data as compared to external benchmarks. For example, a percentage for a tolerance may be established based on month-end-to-month-end percent variation in a benchmark index. The benchmark index may be a value or volume based market index such as the Standard and Poors (S&P) 500, the S&P 100, the S&P 400 midcap, the S&P 600 midcap, the Dow Jones (DJ) Industrials, the DJ Transportation, the DJ Utilities, the DJ Composite, the New York Stock Exchange (NYSE) Volume in 000's, the NYSE Composite, the NYSE Tick, the NYSE ARMS, the Nasdaq Composite, the Nasdaq Volume in 000's, the Nasdaq National Market Composite, the Nasdaq 100, the AMEX Composite, the AMEX Internet, the AMEX Networking, the ISDEX, the Major Market, the Pacific Exchange Technology, the Philadelphia Semiconductor, the Russell 1000, the Russell 2000, the Russell 3000, the TSC Internet, the Value Line, or the Wilshire 5000 TOT. The index may be based on bonds, commodities, or other financial instruments, such as the US Treasury Securities (TS) 30-Year Bond, the TS 10-Year Note, the TS 5-Year Note, the TS 13-Week Bill, the DJ Spot, the DJ Futures, the Philadelphia Gold & Silver, the Hang Seng, the Nikkei 225, the DAX, the CAC 40, or the FTSE 100. Other financial indicators may also be used, such as the Federal Funds rate, the Discount Rate, the Consumer Price Index, the Gross National Product, the Gross Domestic Product, and so forth. The aforementioned list of indices is only provided to present an illustrative set of indices, and should not be construed as exhaustive. Any financial index or other index suitable for comparison to changes in the measured quantity (in this case, net asset value of a fund) may be used with the systems described herein. Further, it will be appreciated that a tolerance may be derived from a selected index, such as by application of a formula to the selected index.

It will be appreciated that the same variance rule may be applied to each instance of data received in step 404, or a different variance rule may be established for each instance, e.g., for each different fund for which data is received, as determined according to, for example, the fund code described above. An interface may be provided for a user to specify a variance rule for each fund received, either together or individually.

Once a variance rule has been determined for received data, it may be determined whether the received data is within tolerance, as shown in step 410. This step may entail a straightforward comparison of the tolerance established by the variance rule of step 408 with the change in the quantity of interest, e.g., in the example above, a change in net asset value from one or more historical values to the value received in step 404. If the received net asset value is within the tolerance, then the process 400 may proceed to step 412 where the received data may be stored. If the received net asset value is out of tolerance, i.e., not within the tolerance range established in step 408, then the process 400 may proceed to step 414.

In step 414, one or more possible explanations for being out of tolerance may be presented to a user that provided the data received in step 404. These preset explanations may be required before storing received data. For the fund net asset value provided as an example above, explanations may include asset transfers, benefit payments, incorrect prior month values, cash influxes, cash withdrawals, collateral NAV changes, contributions, conversions, closing of funds, merger of funds, supplied and client verified NAVs, derivative fluctuations, changes in security market values, expenses, fund mergers, holding accounts, liquidation of partial assets, new money from shareholders, creation of a new fund, shareholder distributions, shareholder redemptions, shareholder subscriptions, trading activities, favorable or unfavorable exchange rates, or valid zero asset balances. Each explanation may have associated therewith a direction of change to which the explanation may apply. That is, certain explanations may only be applicable to changes that are greater than the established tolerance. Other explanations may only be applicable to changes that are less than the established tolerance. Some explanations may apply to either increases or decreases in the measured quantity. The type of variation to which each explanation applies may be displayed along with the explanations, or may be used to filter explanations prior to display, so that only applicable explanations are presented to a user. The explanations may include an "other" category, with which a user provides textual explanation. Optionally, no "other" may be provided, so that a user is required to select one of a plurality of specifically enumerated reasons.

The explanations above may be preset before data is provided. A user interface may be provided through which an authorized user may edit the preset explanations. Explanations available to a provider of data may be added, removed, or modified. Editing the available explanations may be appropriate, for example, in response to changes in economic or financial conditions, changes in accounting rules or procedures, or any other changes that may affect values for the received data.

As shown in step 416, a selection of one of the possible explanations may be received from the data provider for the data received in step 404. Once an explanation has been received, the data and the explanation may be stored, as shown in step 412. The process 400 is then done 418, and may be terminated, or may return to the start 402 where new data may be received.

When data has been entered and tested for variations as described above, an explicit record of substantial (as measured by defined variance rules) changes is preserved, and may be reviewed by managers, customers, or others who have appropriate authority to access data records in the system and may be interested in, for example, fund performance and variations.

It will be appreciated that the above process 400, may be realized in hardware, software, or some combination of these. The process 400 may be realized in one or more microprocessors, microcontrollers, embedded microcontrollers, programmable digital signal processors or other programmable device, along with internal and/or external memory such as read-only memory, programmable read-only memory, electronically erasable programmable read-only memory, random access memory, dynamic random access memory, double data rate random access memory, Rambus direct random access memory, flash memory, or any other volatile or non-volatile memory for storing program instructions, program data, and program output or other intermediate or final results. The process 400 may also, or instead, be realized in an application specific integrated circuit, a programmable gate array, programmable array logic, or any other device or combination of devices that may be configured to process electronic signals.

Any combination of the above circuits and components, whether packaged discretely, as a chip, as a chipset, or as a die, may be suitably adapted for use with the systems described herein. It will further be appreciated that the above process 400 may be realized as computer executable code created using a structured programming language such as C, an object-oriented programming language such as C++ or Java, or any other high-level or low-level programming language that may be compiled or interpreted to run on one of the above devices, as well as heterogeneous combinations of processors, processor architectures, or combinations of different hardware and software. The process 400 may also be deployed using software technologies or development environments including a mix of software languages, such as Microsoft IIS, Active Server Pages, Java, C++, Oracle databases, SQL, and so forth.

Figure 5:
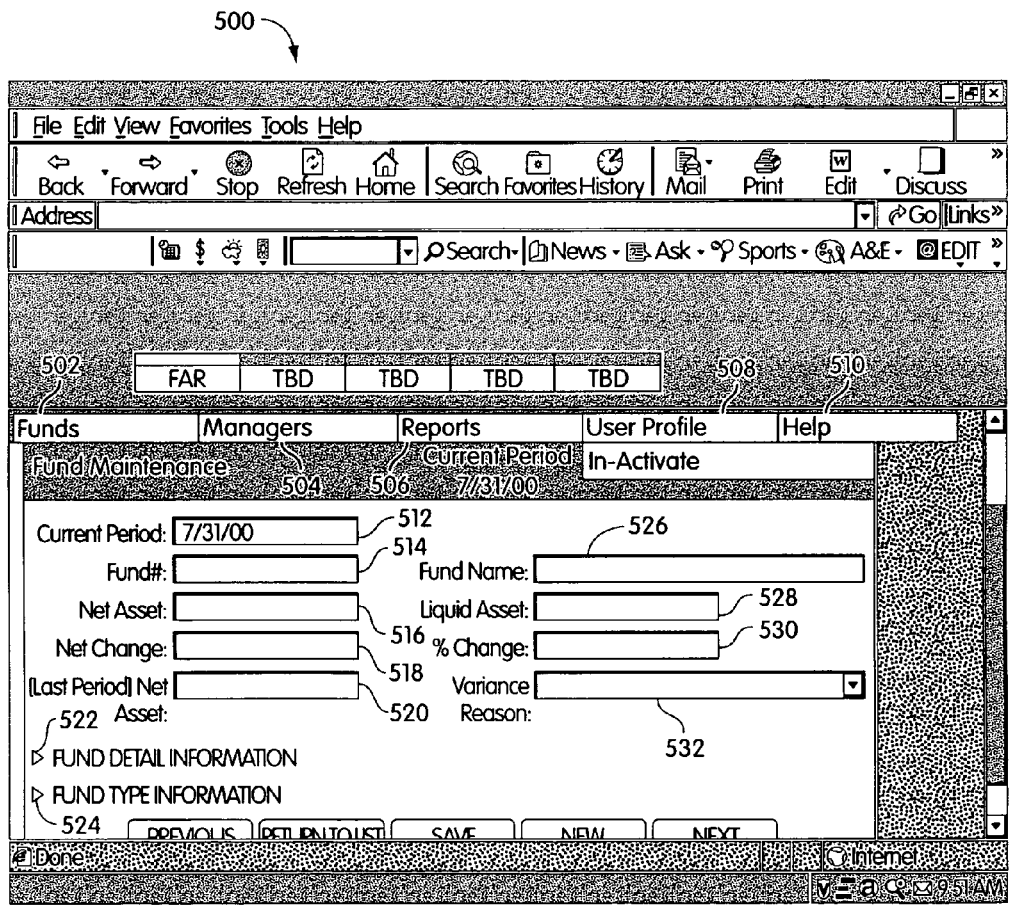
FIG. 5 depicts a user interface that may be used with the systems described herein.

FIG. 5 depicts a user interface that may be used with the systems described herein. More particularly, FIG. 5 shows an interface for providing explanations for data variance, as in steps 414 and 416 above. An interface 500, which may be a Web page, may include a funds button 502, a managers button 504, a reports button 506, a user profile button 508, a help button 510, a current period display area 512, a fund display area 514, a net asset value display area 516, a net change display area 518, a previous net asset value display area 520, a fund detail information link 522, a fund type information link 524, a fund name display area 526, a liquid asset value display area 528, a percentage change display area 530, and a variance reason selection input 532. The interface 500 may be presented to a user, e.g., a data provider, when data is provided to the system that exceeds predetermined tolerances as described above.

The funds button 502 may be used to navigate to a fund information page that provides information about funds with data stored by the system. The managers button 504 may be used to navigate to a managers information page that provides information about managers who are authorized users of the system. The reports button 506 may be used to access a report generation menu that may be used to print or download reports on funds, managers, variances, or any other data accessible through the system. The help button 510 may be used to access a help menu that provides descriptions of various functions, tool, menus, and the like provided by the system.

Information relating to the variant data may be provided by the interface 500. This may include the current period display area 512 which displays the time period for which the new data is being provided. The fund display area 514 may display a fund code that identifies the fund to which the new data relates. The net asset value display area 516 may display the current net asset value supplied for the current time period. The net change display area 518 may display the change from an historical value for the net asset value, the historical value being further displayed in the previous net asset value display area 520. The fund name display area 526 may display the full name, or an abbreviated name, of the fund identified by the fund code. The liquid asset value display area 528 may display the liquid asset value of the fund identified by the fund code (and the fund name). The percentage change display area 530 may display a percentage change between the current net asset value and the historical net asset value. The variance reason selection input 532 may be, for example, a drop down menu of explanations, and may be operated by a user to select a specific reason for the variance.

Other reference data may be accessed through the interface 500, such as information about funds tracked within the system (through the fund detail information link 522) and information about fund types tracked within the system (through the fund type link 524). Other buttons may be provided, such as buttons to navigate through a number of variance entry screens, which may be used, for example, when data for a number of funds are collectively supplied to the system (such as through a spreadsheet upload).

The interface 500 of FIG. 5 may also, or instead, be used to manually enter data for a number of funds. A fund manager may, in this mode, access the interface 500 during each reporting period, and manually enter a net asset value in the net asset value display area 516 for each fund managed by the manager. If a manager attempts to save data for a fund that exceeds its tolerance, a warning may pop-up alerting the manager to the omission, and requiring selection of a reason before saving the data.

It will be appreciated that the interface 500 described above is merely exemplary, and that other controls such as radio buttons, sliders, scroll bars, and so forth may be used to receive user inputs, display data, and enable navigation through a Web site. It will also be appreciated that, as noted above, the systems and methods described herein may be suitably adapted to any data collection system for any type of data that is manually or automatically entered under user supervision. All such embodiments may fall within the scope of the invention described herein.

Thus, while the invention has been disclosed in connection with the preferred embodiments shown and described in detail, various modifications and improvements thereon will become readily apparent to those skilled in the art. It should be understood that all matter contained in the above description or shown in the accompanying drawings shall be interpreted as illustrative, and not in a limiting sense, and that the following claims should be interpreted in the broadest sense allowable by law.

What is claimed is:

1. A computer-implemented method for verifying a fund's net asset value comprising:

receiving from a data provider, though an electronic interface, a first net asset value for a fund;

retrieving, over an electronic communications network, one or more historical net asset values for the fund from an electronic fund performance database;

comparing the first net asset value to one or more historical net asset values for the fund to obtain a variance that characterizes a difference between the first net asset value and the one or more historical net asset values;

when the variance is within a tolerance for the first net asset value, storing the first net asset value in the electronic fund performance database; and when the variance is not within the tolerance for the first net asset value;
 i) presenting, though the electronic interface, a plurality of preset explanations for the variance to the data provider;
 ii) requiring the data provider to select one of the plurality of preset explanations for the variance;
 iii) storing, in the electronic fund performance database, the first net asset value and the selected one of the plurality of preset explanations for the variance.

2. The method of claim 1, wherein the data provider is at least one of a third-party data provider or a fund manager.

3. The method of claim 1, wherein the tolerance is user-modifiable.

4. The method of claim 1, wherein the tolerance is a range of acceptable percentage variations.

5. The method of claim 4, wherein the acceptable percentage variations are based on a month-end to month-end variation in at least one of the Dow Jones Industrial Average or the Standard and Poors 500.

6. The method of claim 4, wherein the range of acceptable percentage variations is a range of between +/−5% and +/−30%.

7. The method of claim 4, wherein the range of acceptable percentage variations is determined relative to the one or more historical net asset values.

8. The method of claim 4, wherein the range of acceptable percentage variations is determined relative to the received net asset value.

9. The method of claim 1, wherein the tolerance is a range of acceptable absolute variations.

10. The method of claim 9, wherein the range of acceptable absolute variation is a range of between +/−$100 million and +/−$2 billion.

11. The method of claim 1, wherein the tolerance is an asymmetrical range of acceptable variations.

12. The method of claim 1, wherein a tolerance is determined individually for each one of a plurality of different funds owned by the customer.

13. The method of claim 1, wherein the tolerance is adjusted according to a market condition.

14. The method of claim 1, wherein the plurality of preset explanations for the variance includes at least one of asset transfers, benefit payments, incorrect prior month values, cash influxes, cash withdrawals, collateral NAV changes, contributions, conversions, closing of funds, merger of funds, supplied and client verified NAVs, derivative fluctuations, changes in security market value, expenses, fund mergers, holding accounts, liquidation of partial assets, new money from shareholders, creation of a new fund, shareholder distributions, shareholder redemptions, shareholder subscriptions, trading activities, favorable or unfavorable exchange rates, or valid zero asset balances.

15. The method of claim 14, wherein the preset explanations are edited by an authorized user.

16. The method of claim 1, wherein receiving the first net asset value for the fund further comprises receiving at least one of a spreadsheet, a comma delimited file, or a tab delimited file that contains the first net asset value.

17. The method of claim 1, wherein receiving the first net asset value for the fund further comprises receiving a net asset value that is manually entered though a user interface.

18. The method of claim 1, further comprising providing to an end-user of a computer system a report that displays a change between the first net asset value and the one or more historical net asset values.

19. The method of claim 1, further comprising displaying to an end-user of a computer system a liquid asset value of the fund.

20. The method of claim 1, wherein the electronic interface is a computer terminal.

21. The method of claim 1, wherein the electronic interface is an electronic network connection.

22. A computer program product for verifying a fund's net asset value comprising:

a computer readable medium having stored thereon:
 computer executable code for receiving from a data provider a first net asset value for a fund owned by a customer;
 computer executable code for comparing the first net asset value to the one or more historical net asset values to obtain a variance that characterizes a difference between the first net asset value and the one or more historical net asset values;
 computer executable code for storing the net asset value in the database when the variance is within a tolerance for the net asset value; and
 computer executable code for, when the variance is not within the tolerance for the net asset value:
  i) presenting, via the electronic interface, a plurality of preset explanations for the variance to the data provider,
  ii) requiring the data provider to select one of the plurality of preset explanations for the variance; and
  iii) storing the net asset value and the one of the plurality of preset explanations for the variance in the database.

23. The computer program product of claim 22, wherein the electronic interface is a computer terminal.

24. The computer program product of claim 22, wherein the electronic interface is an electronic network connection.

25. A system for verifying a fund's performance comprising:

means for receiving from a data provider a first net asset value for a fund;

means for comparing the first net asset value to one or more historical net asset values for the fund to obtain a variance that characterizes a difference between the first net asset value and the one or more historical net asset values;

means for storing the first net asset value in a database when the variance is within a tolerance for the first net asset value; and means for, when the variance is not within the tolerance for the first net asset value:
 i) presenting a plurality of preset explanations for the variance to the data provider,
 ii) requiring the data provider to select one of the plurality of preset explanations for the variance; and
 iii) storing the net asset value and the one of the plurality of preset explanations in the database.

26. A system for verifying a fund's net asset value comprising:

a database having memory for storing financial data for one or more funds, the financial data for the one or more funds including one or more historical net asset values for the one or more funds;

a client device connected in a communicating relationship with a network, the client device receiving fund data relating to the one or more funds, the fund data including a new net asset value for at least one of the one or more funds;

a server connected in a communicating relationship with the database and the client device, the server receiving the fund data from the client device and executing a process to compare the new net asset value to the one or more historical net asset values, the process further configured to present a plurality of preset explanations for the variance to the client device when a variance between the new net asset value and the one or more historical net asset values exceeds a tolerance, and, when the tolerance is exceeded, further configured to store the new net asset value only when a selected one of the plurality of preset explanations for the variance has been received from the client device.

27. The system of claim 26, the server further configured to present a user interface to a second client device, the user interface providing controls for adding, deleting, or modifying one of the plurality of preset explanations.

28. The system of claim 26, the server further configured to present a user interface to a second client device, the user interface providing controls for modifying the tolerance.

* * * * *